Figure 2:
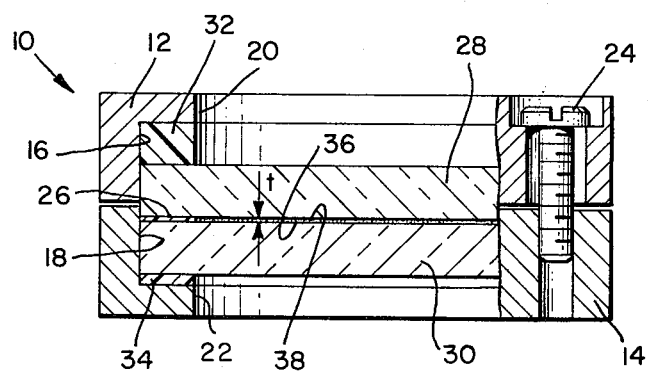

United States Patent [19]

Buchman

[11] 3,997,854
[45] Dec. 14, 1976

[54] PASSIVE Q-SWITCH CELL
[75] Inventor: William W. Buchman, Los Angeles, Calif.
[73] Assignee: Hughes Aircraft Company, Culver City, Calif.
[22] Filed: Dec. 15, 1975
[21] Appl. No.: 640,620
[52] U.S. Cl. .......................... 331/94.5 L; 356/246
[51] Int. Cl.² .................................. H01S 3/02
[58] Field of Search ................... 356/246; 331/94.5
[56] References Cited
UNITED STATES PATENTS
3,560,077   2/1971   Sooy et al. ..................... 356/246

Primary Examiner—William L. Sikes
Attorney, Agent, or Firm—Paul M. Coble; W. H. MacAllister

[57] ABSTRACT

A passive laser Q-switch cell is disclosed wherein a chamber containing a liquid Q-switching material has an extent along the laser beam path not greater than approximately 0.25 mm. When the laser beam has a frequency of approximately 1.06 μm, the Q-switching material may consist of a substantially saturated solution of the dye complex bis(4-dimethylaminodithiobenzil)nickel in toluene.

3 Claims, 2 Drawing Figures

PASSIVE Q-SWITCH CELL

This invention relates to laser Q-switching, and more particularly relates to an improved passive Q-switch cell capable of reliably producing a series of laser pulses at substantially increased pulse repetition frequencies.

There recently has been increased interest in the use of passive Q-switch cells to control and regulate laser output pulses. Such cells usually contain a saturable absorbing dye solution which responds automatically to stimulated emission of radiation from an associated laser to change from an absorbing to a transmitting condition. Upon becoming transmissive, the lower loss allows the generation of a giant laser pulse. After this pulse is completed, the dye reverts to its previous absorbing condition.

Although prior passive Q-switch cells are capable of reliably producing laser pulses of high peak power at relatively low pulse repetition frequencies, as the laser pulse repetition frequency is increased, sufficient heating of the dye solution occurs to generate turbulance which precludes or impairs effective Q-switching action. As a result, Q-switched pulses of nonuniform energy are produced, and some of the desired Q-switched pulses do not occur at all. As a specific example, reliable passive Q-switching of the 1.06 $\mu$m output from neodymium lasers has been limited to about two pulses per second.

It is an object of the present invention to provide a passive Q-switch cell capable of reliably providing substantially uniform energy laser output pulses as a function of time at substantially higher pulse repetition frequencies than heretofore has been achieved.

It is a further object of the present invention to provide a passive Q-switch cell which is operable over a wide range of laser pulse repetition frequencies and for which the energy per pulse remains substantially constant as the pulse repetition frequency is increased.

It is still another object of the invention to provide a dye cell for Q-switching 1.06 $\mu$m laser energy at pulse repetition frequencies as high as 20 pulses per second without any missing pulses.

A passive Q-switch cell according to the invention defines a chamber containing a liquid Q-switching material and adapted to be disposed in the path of a laser beam. The chamber has an extent along the laser beam path not greater than approximately 0.25 mm. When the laser beam has a frequency of approximately 1.06 $\mu$m, the Q-switching material may consist of a substantially saturated solution of the dye complex bis(4-dimethylaminodithiobenzil) nickel.

Figure 1:
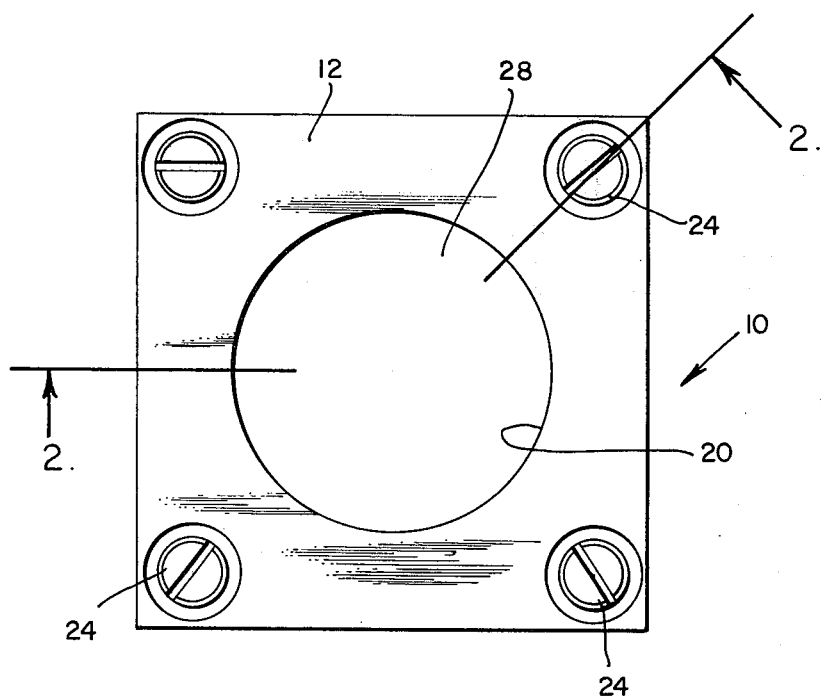

Additional objects, advantages and characteristic features of the invention will become apparent from the following detailed description of a preferred embodiment of the invention when considered in conjunction with the accompanying drawing wherein:

FIG. 1 is an end view illustrating a passive Q-switch cell according to the invention; and FIG. 2 is a sectional view taken along line 2—2 of FIG. 1.

Referring to FIGS. 1 and 2 with greater particularity, there is shown a passive Q-switch cell 10 having a pair of casing members 12 and 14 for holding the interior parts of the cell 10 in clamp-like fashion. The casing members 12 and 14, which may be of a metal such as aluminum, define coaxially aligned enlarged cylindrical bores 16 and 18, respectively, in their axially inner regions to provide a chamber for containing the interior parts of the cell 10. The casing members 12 and 14 further define coaxially aligned reduced diameter cylindrical bores 20 and 22, respectively, in their axially outer regions to provide for the passage of a light beam axially through the cell 10. Casing members 12 and 14 may be held in assembled clamping relationship by means of a plurality of bolts or screws 24 disposed in counterbored holes in the peripheral portions of the members 12 and 14.

Disposed within the chamber defined by the enlarged bores 16 and 18 is a thin annular spacer 26, of Teflon for example, sandwiched between a pair of circular glass plates 28 and 30. The spacer 26 has an outer diameter just smaller than the diameter of the enlarged bores 16 and 18 and has an inner diameter approximately equal to the diameter of the smaller bores 20 and 22. Similarly, the diameter of the plates 28 and 30 is just smaller than that of the enlarged bores 16 and 18. The glass plates 28 and 30 have optically flat broad surfaces, with the outer broad surface of each plate 28 and 30 in the sandwiched configuration being provided with an anti-reflection coating. Disposed between the plate 28 and the end portion of casing member 12 is an annular gasket 32, of neoprene for example, having an outer diameter just smaller than the diameter of the bore 16 and having an inner diameter approximately equal to the diameter of the bore 20. A shorter but otherwise similar gasket 34 is disposed between glass plate 30 and the end portion of casing member 14. The sandwiched arrangement consisting of the gaskets 32 and 34, glass plates 28 and 30 and the spacer 26 may be held in a rigidly clamped and sealed relationship by tightening the screws 24 in the casing members 12 and 14.

The enclosed space defined by the lateral walls of the spacer 26 and the facing broad surfaces of the plates 28 and 30 form a cavity 36 which contains a desired Q-switching liquid 38. As a specific example, when the cell 10 is to be used for Q-switching laser radiation at a frequency of around 1.06 $\mu$m, the liquid 38 may consist of a substantially saturated solution of the dye complex bis(4-dimethylaminodithiobenzil) nickel. Such a dye complex is sold by Eastman Kodak Company as EASTMAN 14015. A suitable exemplary dye solution may be formed by dissolving 100 mg of the aforementioned dye complex in 120 ml of toluene. After any undissolved dye has been allowed to settle, the dye solution may be introduced into the cavity 36, for example by means of an eye dropper. It may be desirable to not quite fill the cavity 36 with the dye solution and subsequently add a few drops of toluene to provide a nearly saturated solution and thereby prevent precipitation of the dye in the event of a decrease in temperature.

In accordance with the principles of the invention, the liquid-containing cavity 36 is made substantially thinner along an axial direction than in the prior art. Specifically, the axial extent, or thickness $t$, of the cavity 36 should not be greater than approximately 0.25 mm. This reduction in cavity thickness enables the reliable production of a series of Q-switched laser pulses at substantially higher pulse repetition frequencies than is possible to achieve with thicker passive Q-switch cavities of the prior art.

More specifically, when a passive Q-switch cell as described above, but with a prior art cavity thickness $t$ = 2 mm, was placed within the optical cavity of a Nd:YAG laser providing an output of approximately 1.06 μm and the laser pulse repetition frequency was increased above two pulses per second, some of the desired Q-switched pulses were inhibited and those Q-switched pulses that did occur were of highly nonuniform energy. On the other hand, with a Q-switch cell 10 according to the invention employing a cavity thickness $t = 0.25$ mm, 1.06 μm laser pulses having a repetition frequency as high as 20 pulses per second were Q-switched without any missing pulses and with essentially the same energy per pulse. Moreover, with a Q-switch cell according to the invention, for a constant laser input energy, the Q-switched pulse energy decreased only slightly as the pulse repetition frequency was increased from one to 20 pulses per second.

The theory underlying the invention is not fully understood at the present time. However, it is believed that the heating of the dye solution causes an expansion of the solution and consequent fluid flow. Whether or not this flow is turbulent is determined by the ratio of inertial forces to viscous forces. In fluid mechanics this ratio is measured by a Reynolds number defined by $\rho vL/\mu$, where $\rho$ is the fluid density, $v$ is the velocity of flow, L is a characteristic length (which is equal to the cavity thickness $t$ for the device of FIGS. 1–2) and $\mu$ is the viscosity of the fluid. Low Reynolds numbers give laminar flow, while high Reynolds numbers result in turbulant flow. Thus, either decreasing the cavity thickness or increasing the viscosity of the dye solvent, or both, should reduce turbulance and thereby reduce optical distortion in the laser beam path through the cell.

Although the present invention has been shown and described with respect to a particular embodiment, nevertheless various changes and modifications which are obvious to a person skilled in the art to which the invention pertains are deemed to lie within the spirit, scope and contemplation of the invention.

What is claimed is:

1. In a passive Q-switch cell defining a substantially cylindrical chamber containing a liquid Q-switching material including the dye complex bis(4-dimethylaminodithiobenzil) nickel, the improvement wherein said chamber has an axial extent not greater than approximately 0.25 mm.

2. The improvement according to claim 1 wherein said Q-switching material consists of a substantially saturated solution of said dye complex in toluene.

3. The improvement according to claim 1 wherein said axial extent of said chamber is approximately 0.25 mm.

* * * * *